US011410173B1

(12) United States Patent
Stickle et al.

(10) Patent No.: US 11,410,173 B1
(45) Date of Patent: Aug. 9, 2022

(54) TOKENIZATION WEB SERVICES (71) Applicant: Amazon Technologies, Inc., Reno, NV (US)

(72) Inventors: Thomas Charles Stickle, Seattle, WA (US); Ryan Holland, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1271 days.

(21) Appl. No.: 13/889,058

(22) Filed: May 7, 2013

(51) Int. Cl.
| *G06Q 20/40* | (2012.01) |
| *G06Q 20/36* | (2012.01) |
| *G06Q 20/12* | (2012.01) |
| *G06Q 20/38* | (2012.01) |
| *G06Q 20/32* | (2012.01) |
| *H04L 9/32* | (2006.01) |
| *G06F 21/60* | (2013.01) |

(52) U.S. Cl.
CPC .......... *G06Q 20/401* (2013.01); *G06F 21/60* (2013.01); *G06Q 20/12* (2013.01); *G06Q 20/3226* (2013.01); *G06Q 20/3674* (2013.01); *G06Q 20/385* (2013.01); *G06Q 20/3829* (2013.01); *G06Q 20/38215* (2013.01); *G06Q 20/4014* (2013.01); *H04L 9/3213* (2013.01); *H04L 9/3234* (2013.01)

(58) Field of Classification Search
CPC .. G06Q 20/12; G06Q 20/38215; G06Q 20/40; G06Q 20/02; G06Q 20/382; G06Q 20/385; G06Q 20/20; G06Q 20/322; G06Q 20/3226; G06Q 20/3674; G06Q 20/3829; G06Q 20/401; G06Q 20/405; G06Q 20/3821; G06Q 20/027; G06Q 20/3223; G06Q 20/4014; G06F 21/60; H04L 9/3213; H04L 9/3234
USPC .......................................................... 705/64
See application file for complete search history.

(56) References Cited

U.S. PATENT DOCUMENTS

| 8,447,983 | B1 * | 5/2013 | Beck | ..................... H04L 9/0894 |
| | | | | 713/172 |
| 8,458,487 | B1 * | 6/2013 | Palgon | ................ G06F 21/6254 |
| | | | | 713/193 |
| 8,892,868 | B1 * | 11/2014 | Jenks | ..................... H04L 29/06 |
| | | | | 713/153 |

(Continued)

OTHER PUBLICATIONS

"Federation Payments using SAML Tokens with Trusted Platform Modules"; David J. Lutz; 2007 12th IEEE Symposium on Computers and Communications (Year: 2007).*

(Continued)

*Primary Examiner* — John W Hayes
*Assistant Examiner* — Edgar R Martinez-Hernandez
(74) *Attorney, Agent, or Firm* — Robert C. Kowert; Kowert, Hood, Munyon, Rankin & Goetzel, P.C.

(57) ABSTRACT

The present disclosure provides systems, methods, and products for providing a tokenization service and a complementary API. The tokenization service may provide format-preserving tokens. The tokenization service may associate different tokens generated by different users from the same data, so that users can retrieve and use associated tokens for collaboration and access to each other's data, information, etc. The tokenization service may restrict the creation of an association between, and access to, users' tokens based on a requirement for a relationships between users according to a social graph model.

22 Claims, 6 Drawing Sheets

(56) References Cited

U.S. PATENT DOCUMENTS

| | | | | |
|---|---|---|---|---|
| 9,092,529 | B1* | 7/2015 | Gyongyi | G06F 16/9535 |
| 9,223,866 | B2* | 12/2015 | Marcucci | G06F 16/951 |
| 2003/0163427 | A1* | 8/2003 | Fung | G06Q 30/02 |
| | | | | 705/51 |
| 2005/0027543 | A1* | 2/2005 | Labrou | G06Q 20/12 |
| | | | | 705/26.35 |
| 2007/0165625 | A1* | 7/2007 | Eisner | G06F 9/546 |
| | | | | 370/389 |
| 2010/0070754 | A1* | 3/2010 | Leach | G06F 21/6254 |
| | | | | 713/152 |
| 2011/0022388 | A1* | 1/2011 | Wu | G10L 15/20 |
| | | | | 704/246 |
| 2011/0078779 | A1* | 3/2011 | Liu | G06F 21/34 |
| | | | | 726/9 |
| 2011/0213807 | A1 | 9/2011 | Mattsson | |
| 2011/0238579 | A1* | 9/2011 | Coppinger | G06Q 20/20 |
| | | | | 705/67 |
| 2012/0041881 | A1* | 2/2012 | Basu | G06Q 20/02 |
| | | | | 705/67 |
| 2012/0059736 | A1* | 3/2012 | Bhattacharya | G06Q 20/12 |
| | | | | 705/26.41 |
| 2012/0158615 | A1* | 6/2012 | Spring | G06F 40/40 |
| | | | | 706/10 |
| 2012/0209749 | A1* | 8/2012 | Hammad | G06Q 30/06 |
| | | | | 705/27.1 |
| 2012/0221558 | A1* | 8/2012 | Byrne | G06F 17/30864 |
| | | | | 707/723 |
| 2012/0259782 | A1* | 10/2012 | Hammad | G06Q 20/12 |
| | | | | 705/44 |
| 2012/0284262 | A1* | 11/2012 | Byrne | G06F 16/90335 |
| | | | | 707/723 |
| 2012/0304273 | A1* | 11/2012 | Bailey | H04L 9/0891 |
| | | | | 726/9 |
| 2012/0310831 | A1* | 12/2012 | Harris | G06Q 30/02 |
| | | | | 705/44 |
| 2012/0316992 | A1* | 12/2012 | Oborne | G06Q 30/06 |
| | | | | 705/26.41 |
| 2013/0103685 | A1 | 4/2013 | Preneel et al. | |
| 2013/0117185 | A1* | 5/2013 | Collison | G06Q 20/3829 |
| | | | | 705/67 |
| 2013/0191286 | A1* | 7/2013 | Cronic | G06Q 20/0855 |
| | | | | 705/44 |
| 2013/0191289 | A1* | 7/2013 | Cronic | G06Q 20/40 |
| | | | | 705/67 |
| 2013/0246390 | A1* | 9/2013 | Wable | G06F 16/951 |
| | | | | 707/711 |
| 2013/0304620 | A1* | 11/2013 | Bhattacharya | G06Q 40/04 |
| | | | | 705/37 |
| 2014/0020068 | A1* | 1/2014 | Desai | H04L 63/10 |
| | | | | 726/4 |
| 2014/0040144 | A1* | 2/2014 | Plomske | G06Q 20/38215 |
| | | | | 705/64 |
| 2014/0172914 | A1* | 6/2014 | Elnikety | G06F 16/9024 |
| 2014/0181101 | A1* | 6/2014 | Wong | G06F 16/24578 |
| | | | | 707/732 |
| 2014/0280043 | A1* | 9/2014 | Griffin | G06F 16/338 |
| | | | | 707/722 |
| 2014/0280260 | A1* | 9/2014 | Boukobza | G06F 16/23 |
| | | | | 707/756 |
| 2015/0169758 | A1* | 6/2015 | Assom | G06F 16/36 |
| | | | | 707/603 |
| 2015/0248664 | A1* | 9/2015 | Makhdumi | G06Q 20/3274 |
| | | | | 235/380 |
| 2015/0278815 | A1* | 10/2015 | Randazza | G06Q 30/0617 |
| | | | | 705/72 |

OTHER PUBLICATIONS

"Using Web Services to Exchange Security Tokens for Federated Trust Management"; Zhengping Wu; Alfred C. Weaver; IEEE International Conference on Web Services (ICWS 2007); (Year: 2007).*

"Dynamic User Credential Management in Grid Environment"; Debasish Jana; Amritava Chaudhuri; Abhijit Datta; Bijan Bihari Bhaumik; TENCON 2005—2005 IEEE Region 10 Conference; (Year: 2005).*

* cited by examiner

TOKENIZATION WEB SERVICES

BACKGROUND

Interacting parties, such as interacting individuals, organizations, and the like, need to share information, often in the form of digital data, in order to transact business, collaborate for various purposes, or otherwise have dealings with each other. Often, the amount of data shared is extremely large, and the interactions are by means of the computing systems of each party that send, receive, process, and produce data for and with each other. A party may have some data, however, that they do not wish to, or are not allowed to, reveal or disclose to other parties, such as sensitive, confidential, proprietary, or legally regulated information. Often, this unshareable data is embedded in or otherwise a part of other data that is shareable. Also, a party may have some sensitive data that they can share, but that they cannot transmit over normal, insecure channels.

Accordingly, it is desirable to develop improved systems, methods and techniques for protecting specific unshareable or untransmittable data from disclosure to another party while still allowing fast, large-scale processing and interactions between parties using related shareable data.

BRIEF DESCRIPTION OF THE DRAWINGS

The accompanying drawings, which are incorporated in and constitute a part of this specification, illustrate embodiments and together with the description, serve to explain the principles of this disclosure. In the figures.

DETAILED DESCRIPTION OF THE EMBODIMENTS

Reference will now be made in detail to various embodiments, examples of which are illustrated in the accompanying drawings. Wherever convenient, the same reference numbers will be used throughout the drawings to refer to the same or like parts. Features, implementations, and embodiments will be set forth in part in the description which follows, or may be learned by practice consistent with this disclosure. It is to be understood that the following detailed description is exemplary and explanatory only and is not restrictive of the claimed featured. The metes and bounds are defined by means of the elements and combinations particularly pointed out in the appended claims.

In the present disclosure, tokenization is a process that enables a data object to be represented by a surrogate value called a token. In various embodiments, a token is generated from the source data (e.g., using a cryptographic hash function or the like) in a manner such that given the token, it is infeasible to generate or recreate the source data that produced the token.

Format-preserving tokenization takes this concept one step further by formatting the token in a manner that matches the length and format of the original data object (i.e., the source data) or some other format specified by a user. For example, the source data for a credit card number may have the format xxxx-xxxx-xxxx-xxxx, where x is a decimal digit, and a format-preserving tokenization may produce a token having the same format xxxx-xxxx-xxxx-xxxx. Thus, the credit card number 1234-5678-9012-3456 may be represented by the format-preserving token 8877-6655-4433-2211. Format-preserving tokenization enables the tokenized data to look just like a valid credit card number. This makes it very simple for a computer application to store the tokenized data using the same field formats and constraints as the source data. A database with a credit card number field is an example of application that may have specific requirements regarding the length and format of the data, and this scheme allows the use of tokenization without requiring any changes to the token. Various types of format-preserving tokenization also make it possible to preserve a portion of the original source data in the token; for example, such that the last four digits of a credit card number remain intact in the token, but the other portion of the credit card number is tokenized.

Various embodiments presented in this disclosure may allow multiple parties to share and access data, while at the same time protecting specific portions of the data from being revealed. For example, consider the case where a Doctor's Office has stored the medical records of patient Joe Smith in a repository using a tokenization-service-generated, format-preserving token representing Joe Smith's social security number, such as the token "8877-6655-4433-2211." Similarly, Joe Smith's Insurance Company has used the tokenization service to generate the non-format-preserving token "00ADE13" from Joe Smith's social security number, and stored Joe Smith's insurance records indexed by the token "00ADE13." The tokenization service enables Joe Smith's Doctor's Office and Insurance Company to collaborate by creating an association between the two tokens representing Joe Smith's social security number. The tokenization service may connect, join, link, map, or otherwise associate these two tokens together, based, for example, on the commonality of the underlying social security number from which they were both generated. The association provided by the tokenization service enables the Insurance Company to submit the token 00ADE13 to the tokenization service and obtain in return the associated Doctor's Office token 8877-6655-4433-2211. Using the Doctor's Office token, the Insurance Company may then access Joe Smith's medical records, which are indexed by the token 8877-6655-4433-2211, to process insurance claims. Similarly, the Doctor's Office may obtain the Insurance Company's token 00ADE13 and use it to run reports across data from multiple entities, such as invoicing and accounts receivable reports showing the services provided by the Doctor's Office and the payment status of each as indicated by the Insurance Company's records. In general, the association among tokens provided by the tokenization service enables collaboration using tokens without exposing personal identity information (PII) or other sensitive data to parties who are not already privy to the underlying data represented by the tokens.

Figure 1:
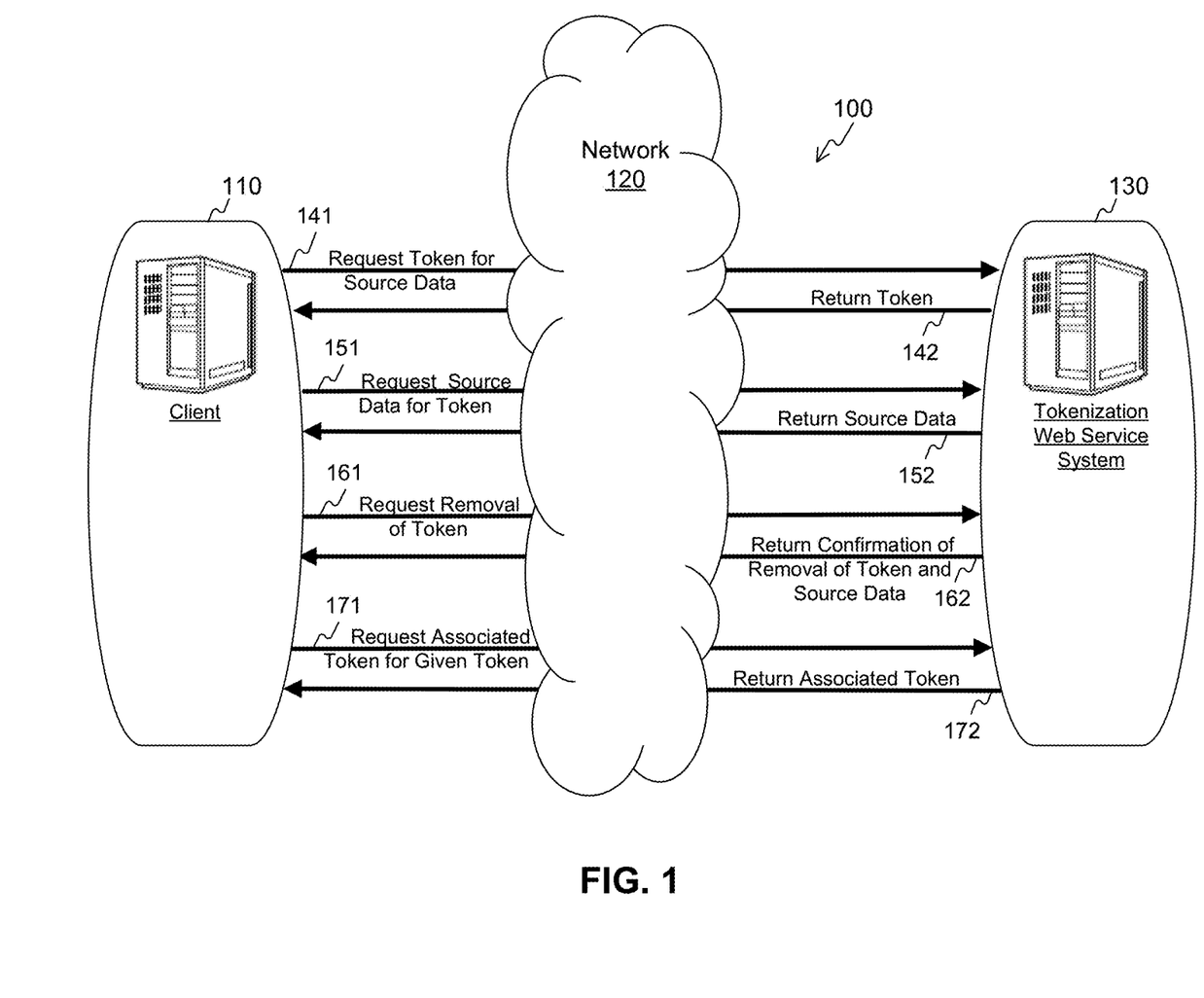
FIG. 1 illustrates an example of a system for a tokenization web service, consistent with the principles of the disclosure.

FIG. 1 illustrates an example of a system 100 for a tokenization web service, consistent with the principles of this disclosure. As shown, system 100 includes a client computer 110 and a tokenization web service 130, which communicate via a network 120.

In the illustrated example, tokenization web service 130 provides via network 120 a customer-facing or user-facing interface to the tokenization web service 130. In various embodiments, tokenization web service 130 may be configured to support interaction between the tokenization service and its users according to a web services model. For example, in some embodiments, the interface to tokenization web service 130 may be accessible by clients as a web services endpoint having a Uniform Resource Locator (URL) to which web services calls generated by service clients (e.g., client 110) may be directed for processing. Generally speaking, a web service may refer to any type of computing service that is made available to a requesting client via a request interface (e.g., an application programming interface (API)) that includes one or more Internet-based application layer data transport protocols, such as a version of the Hypertext Transport Protocol (HTTP) or another suitable protocol.

Web services may be implemented in a variety of architectural styles, using a variety of enabling service protocols. For example, in a Representational State Transfer (REST)-style web services architecture, the parameters that are pertinent to a web services call (e.g., specifying the type of service requested, user credentials, user data to be operated on, etc.) may be specified as parameters to the data transport command that invokes the web services call to the web services endpoint, such as an HTTP GET or PUT command. In some implementations, REST-style web services architectures are stateless, in that each web services call may contain all the information necessary to process that call without reference to external state information. In contrast to REST-style web services architectures, document-based or message-based web services architectures may encode the parameters and data pertinent to a web services call as a document that may be transmitted to a web services endpoint and then decoded and acted upon by the endpoint. For example, a version of eXtensible Markup Language (XML) or another suitable markup language may be used to format the web services request document. In some embodiments, the markup language used to format the request document may delimit parameters that control the processing of the request, while in other embodiments certain features of the markup language itself (e.g., certain tags) may directly control aspects of request processing. Additionally, in some embodiments, the resulting document may be encapsulated within another protocol, such as a version of the Simple Object Access Protocol (SOAP), for example, in order to facilitate processing of the web services request by the endpoint.

Other protocols may also be employed within various embodiments of web services architectures. For example, a version of Web Services Description Language (WSDL) may be employed by a web services endpoint to publish its interfacing requirements to potential clients. Web services endpoints may make themselves known to potential clients through a directory protocol such as a version of the Universal Description, Discovery and Integration (UDDI) protocol. Numerous other types of protocols relating to the provision of computing services via web services interfaces may exist, and any given web services implementation may use any suitable combination of such protocols.

In some embodiments, tokenization web service 130 may support interfaces and/or protocols other than web services interfaces, instead of or in addition to a web services interface. In some embodiments, an interface to tokenization web service 130 may support each of the various types of interfacing protocols through which any user of the tokenization service may access the service. In other embodiments, different instances of tokenization web service 130 may be provided with interfaces for each distinct interface approach. It is noted that in some embodiments, those aspects of an interface for tokenization web service 130 related to handling interactions with clients (e.g., receiving and responding to service requests) may be implemented separately from those aspects that implement the general architecture of the tokenization service (e.g., the generation, storage, association, retrieval, deletion, etc. of tokens and client relationships). In some such embodiments, the portion of an interface to tokenization web service 130 relating to client interaction (e.g., via web services protocols) may be bypassed by certain users, such as those internal to an enterprise.

In various embodiments, tokenization web service 130 may include functionality and an interface for client 110 to add source data (i.e., a source data object) and receive in return a token representing the source data. As shown in FIG. 1, client 110 may send a request 141 for a token to be generated from specified source data (i.e., a data object), which is to be added (e.g. stored) by the service, where in a typical implementation the source data is provided by client 110 with the request 141. In response, tokenization web service 130 returns 142 a newly generated token. In various embodiments, tokenization web service 130 may implement format-preserving tokenization, and request 141 may allow users (e.g., client 110) to define arbitrary token format fields. In some implementations, this may be done through an API that specifies field formatting rules using a declarative syntax to describe the format-preserving tokenization.

In various embodiments, tokenization web service 130 may include functionality and an interface for client 110 to send a token and receive in return the source data from which the token was generated. As shown in FIG. 1, client 110 may send a request 151 for the source data corresponding to a token, where the token is provided by client 110 with the request 151. In response, tokenization web service 130 returns 152 the corresponding source data.

In various embodiments, tokenization web service 130 may include functionality and an interface for client 110 to remove or delete a token and its source data. As shown in FIG. 1, client 110 may send a request 161 for removal of a token, where the token is provided by client 110 with the request 161. In response, tokenization web service 130 deletes the previously stored token and its corresponding source data, and returns 162 a confirmation of the removal.

In various embodiments, tokenization web service 130 may include functionality and an interface for client 110 to request a token that is associated with a specified token and receive in return the associated token. In various embodiments, an associated token is a token that was generated from the same source data as the specified token. In some embodiments, a token may also have to satisfy other criteria in order to be considered associated with the specified token. As shown in FIG. 1, client 110 may send a request 171 for an associated token corresponding to a specified token, where the specified token is input by client 110 with the request 171. In response, tokenization web service 130 returns 172 the associated token.

One of ordinary skill will recognize that the components and implementation details of system 100 are simplified examples presented for conciseness and clarity of explanation. Other components, implementation details, and variations may be used. For example, any of the requests 141, 151, 161, 171, may return, where appropriate, an error code or other indication that the request has failed or that tokenization web service 130 cannot return the expected response. For instance, in response to a request 171 for an associated token corresponding to a token, the tokenization web service 130 may return 172 an indication that there are no associated tokens. For another instance, in response to a request 151 for the source data corresponding to a specified token, web service 130 may return 152 an indication that it does not recognize the specified token, that there is no corresponding source data, and/or that client 110 is not authorized to receive the corresponding source data. Other variations are possible.

Figure 2:
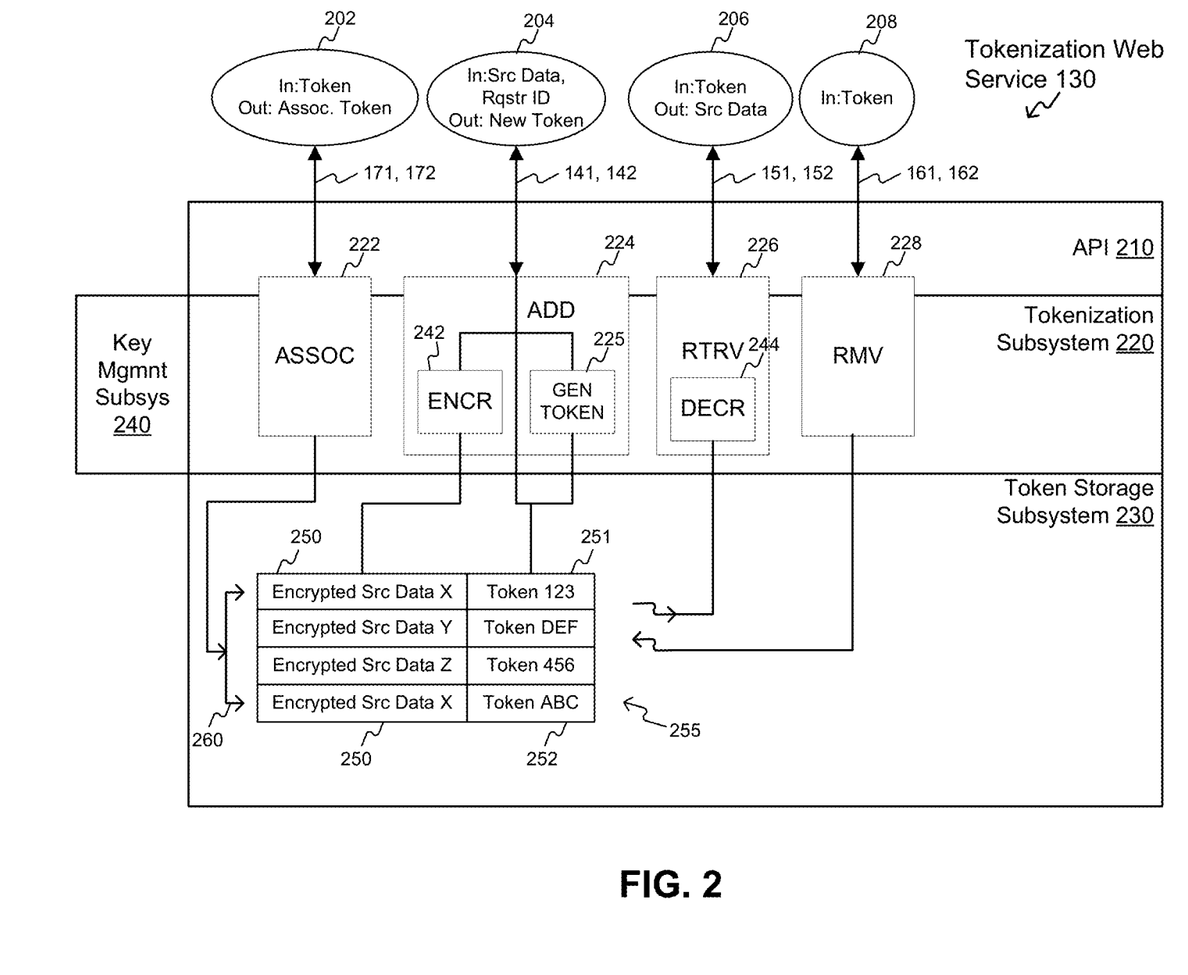
FIG. 2 illustrates an example of an embodiment of a tokenization web service, consistent with the principles of the disclosure.

FIG. 2 illustrates an example of an embodiment of a tokenization web service 130, consistent with the principles of this disclosure. In the embodiment shown, the tokenization web service 130 is composed of three major subsystems: a tokenization subsystem 220 which is surfaced with an API 210, (e.g., a REST-style API); a storage subsystem 230; and a key management subsystem 240.

The tokenization subsystem 220 provides the functionality of the tokenization web service 130, including functionality to add 224 source data (i.e., a source data object) and generate a new token, for example as described with respect to request 141 and return 142 of FIG. 1. More particularly, in various embodiments, the add function 224 may receive source data and requestor ID data as an input 204, for example via the request 141. The add function 224 may generate 225 a token from the input source data and requestor ID data 204. In embodiments that implement format-preserving tokenization, the input 204 may also include token-formatting instructions or data. In the embodiment shown, the requestor ID data is unique to the requestor that made the API call 141 to add/generate a token, and so the tokens generated by the token generation subfunction 225 using the requestor ID data as part of its input will be different for different requestors, even if each requestor submits the exact same source data.

In addition to generating a new token, the add function 224 may encrypt 242 the source data, producing encrypted source data. In various embodiments, the encrypt subfunction 242 may be implemented using the Advanced Encryption Standard (AES) algorithm to encrypt the source data object.

After generating a token from the source data and encrypting the source data, the add function 224 may store the encrypted source data in conjunction with the token in the token storage subsystem 230 (e.g., "Encrypted Src Data X" 250 and "Token 123" 251 in the top row of a lookup table 255 of FIG. 2). In various embodiments, the token storage subsystem 230 stores the encrypted source data and the token in a conjoined manner that allows the encrypted source data to be looked up or identified, given the token, and vice versa. In some embodiments, as shown in FIG. 2, the token storage subsystem 230 may store the encrypted source data and the corresponding token in the same row of the lookup table 255. Other data structures for conjoining and providing access to the encrypted source data and its corresponding token may alternatively be used.

In addition to storing the newly generated token, the add function 224 also returns 142 the token in output data 204.

The tokenization subsystem 220 also includes functionality to retrieve 226 source data corresponding to a given token, for example as described with respect to request 151 and return 152 of FIG. 1. More particularly, in various embodiments, the retrieve function 226 may receive a token as an input 206, for example via a request 151. The retrieve function 226 may access the token storage subsystem 230 to find the encrypted source data that is stored in conjunction with the token that was input, decrypt 244 the encrypted source data, and then return 152 the decrypted source data as output 206 to the requestor. In some embodiments, as shown in FIG. 2, the encrypted source data and the corresponding token may be stored in the same row of the lookup table 255, which provides fast search and retrieval for a given token and its corresponding source data. Other data structures or search techniques may also be used, such as NoSQL database for storage with unstructured query language (UnQL) for searching.

The tokenization subsystem 220 also includes functionality to remove 228 a token and its source data, for example as described with respect to request 161 and return 162 of FIG. 1. More particularly, in various embodiments, the remove function 228 may receive a token as an input 208, for example via a request 161. The remove function 228 may access the token storage subsystem 230 to find the stored token and the encrypted source data that is stored in conjunction with the token and delete them from the token storage subsystem 230 (e.g., by deleting their row from the lookup table 255).

In the embodiment shown in FIG. 2, the tokenization subsystem 220 also includes functionality to find an associated token 222 for a given token, for example as described with respect to request 171 and return 172 of FIG. 1. More particularly, in various embodiments, a find associate function 222 may receive a token as an input 202, for example via a request 171. The find associate function 222 may access the token storage subsystem 230 to find a token that was generated from the same source data as the input token. In some embodiments that utilize an encryption function 242 that produces the same encrypted output each time the same input is used, the find associate function 222 may first find the encrypted source data in lookup table 255 corresponding to the input token and then search for another entry(ies) in lookup table 255 that has the same encrypted source data In other words, the find associate function 222 can index on the encrypted source data, (i.e., use the encrypted source data as a search key), to find another row(s) in the lookup table 255 that corresponds to the same original source data. For a specific example with respect to FIG. 2, if the input 202 is the token "Token 123", then the find associate function 222 may first search the lookup table 255 for the row containing "Token 123" 251, which is the first row, and which indicates that "Encrypted Src Data X" 250 is the corresponding encrypted source data. The find associate function 222 may then search the lookup table 255 for another row(s) containing "Encrypted Src Data X" 250, which in this example is the last row of the lookup table 255, as represented by arrows 260. The token for this last row is "Token ABC" 252. Thus, "Token ABC" 252 is considered to be associated with "Token 123" 251 because both tokens were generated from the same underlying source data, as represented in encrypted form by "Encrypted Src Data X" 250 in the first row and the last row of table 255.

The key management subsystem 240, in the embodiment shown in FIG. 2, manages the encryption keys used by the encryption function 242 and the decryption function 244. In various embodiments, the source data received as input from callers (e.g., client 110) is encrypted when stored at rest in the storage subsystem 230. Some embodiments may use a symmetric encryption algorithm to perform the encrypt and decrypt functions 242 and 244, where the symmetric keys are always encrypted with an asymmetric key from the key management subsystem.

One of ordinary skill will recognize that the components and implementation details of the illustrated tokenization web service 130 are simplified examples presented for conciseness and clarity of explanation. Other components, implementation details, and variations may be used without departing from the principles of this disclosure. For example, additional functions may be added to the tokenization subsystem 220 and API 210, such as a function for specifying, per user or client, the types of tokens, or specific tokens, that can be shared with other users or clients in response to a request for an associated token 171, 172. For another example, a function may be added to the tokenization subsystem 220 and API 210 for specifying, per user or client, perhaps using a social graph, the other users or clients of the tokenization web service 130 that are cleared, allowed, or authorized to request or lookup the client's token that are associated with their tokens. Other variations are possible.

Figure 3:
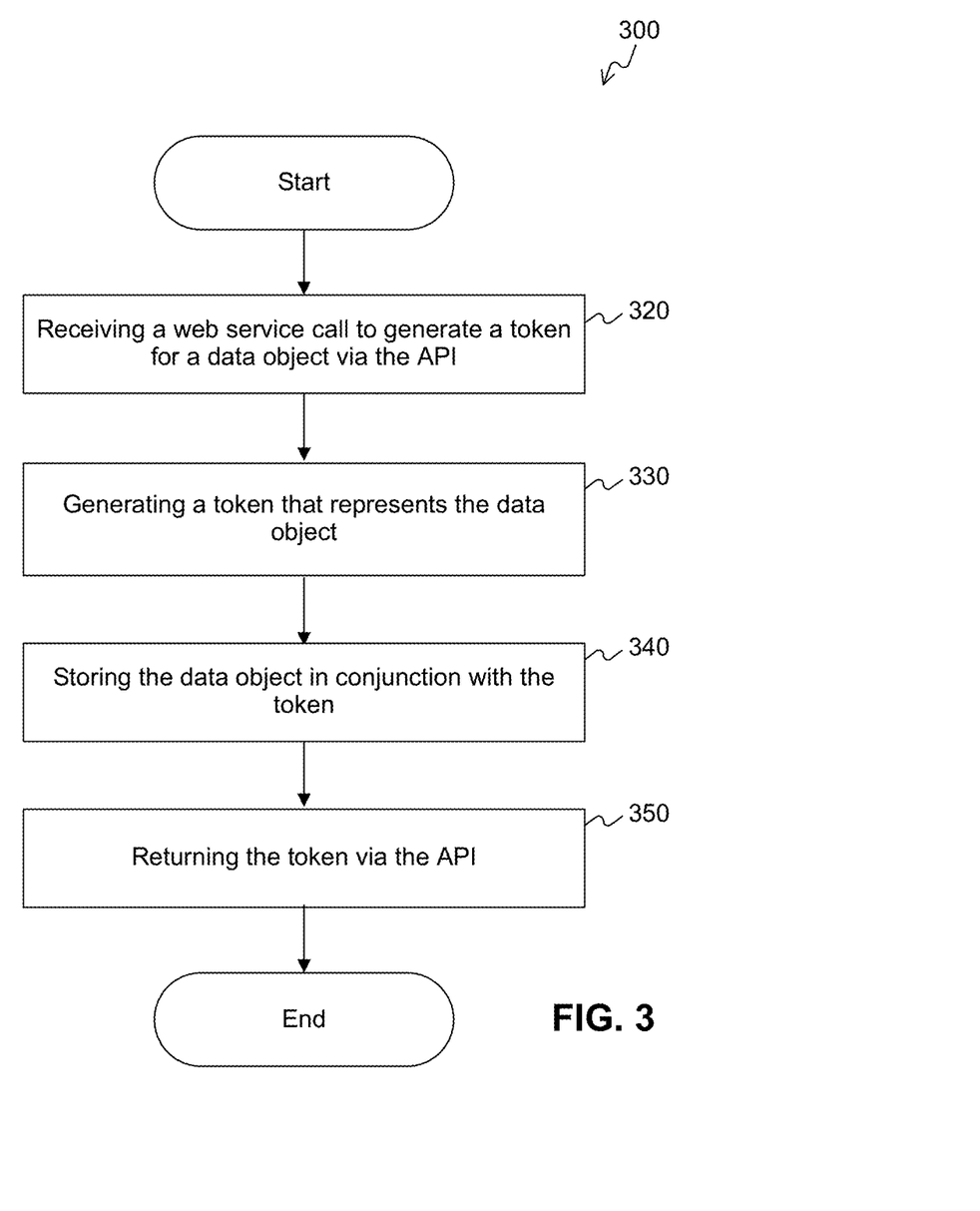
FIG. 3 is an example of a process for a tokenization web service, consistent with the principles of the disclosure.

FIG. 3 is an example of a process 300 for a tokenization web service, consistent with the principles of this disclosure. In some embodiments, process 300 may be implemented in software or firmware running on one or more servers, or other computing system(s), that provides tokenization web services, such as a server that hosts the tokenization web services 130 of FIG. 1. In various embodiments, the tokenization web service of process 300 may be accessed via an application programming interface (API). In various embodiments, such an API may define one or more web services calls available to a client for accessing the tokenization web service. In various embodiments, the tokenization web service API may support operations for adding a data object (e.g., source data) to the tokenization web service and returning a corresponding token; for retrieving a data object that corresponds to a specified token; for removing or deleting a data object and its corresponding token from the tokenization web service, and for retrieving an associated token that corresponds to a specified token. In some embodiments, more or fewer operations may be supported.

At stage 320, process 300 receives a web service call to generate a token for a data object, and the call is received via the provided API. In various embodiments, as noted previously, the web service call may include parameters that are pertinent to the corresponding web service operation (e.g., specifying the type of service requested, user credentials, input source data to be operated on, etc.). In this example, the parameters may be pertinent to the operations for generating a token for a data object, such as parameters specifying the format of the token to be returned by the web service. In some embodiments implemented as Internet web services, these parameters may be specified as attributes to the data transport command (e.g. HTTP request) that invokes the web services call to the web services endpoint.

In various embodiments, the functionality for the call to generate a token for a data object may be implemented as described previously with respect to FIGS. 1 and 2 in connection with the request 141 for a token to be generated from specified source data.

At stage 330, process 300 generates a token that represents the data object. In various embodiments, the token may be generated by a cryptographic hash function or the like. In various embodiments, the format of the generated token may conform to conditions specified in the web service call, where the conditions are specified in a manner that preserves the format of the original data object.

In various embodiments, stage 330 may be implemented as described previously with respect to the add function 224 of FIG. 2.

Process 300 next stores the data object in conjunction with the token (stage 340). In some embodiments, stage 340 may encrypt the data object before storing it in conjunction with the token. Various embodiments of stage 340 may use any number of techniques and/or data structures to implement storing the data object in conjunction with the token, including lookup tables and NoSQL databases. The exact implementation is not critical, as long as the implementation allows the data object, or an encrypted version of the data object, to be located and accessed using only the token.

In various embodiments, stage 340 may be implemented as described previously with respect to the add function 224 of FIG. 2.

At stage 350, process 300 returns the token generated at stage 330 via the API, and then ends. In various embodiments, the web service call of stage 320 may return the token to the caller according to the protocol used by the API. For example, in a REST-style implementation, stage 350 may return a response containing the token to the requestor from whom the web service call was received in stage 320.

One of ordinary skill will recognize that process 300 is presented for conciseness and clarity of explanation, and that stages may be added to, deleted from, reordered, or modified within process 300 without departing from the principles of this disclosure. For example, stages may be added to receive, process, and respond to other web service calls related to a tokenization web service, such as a call to retrieve the source data object corresponding to a specified token, (e.g., as described with respect to the retrieve function 226 of FIG. 2); a call to delete the source data object corresponding to a specified token, (e.g., as described with respect to the remove function 228 of FIG. 2); a call to return a token that is associated with a specified token, (e.g., as described with respect to the associate function 222 of FIG. 2); a call to specify the tokens that are permitted to be associated with other tokens from different users; etc.

Figure 4:
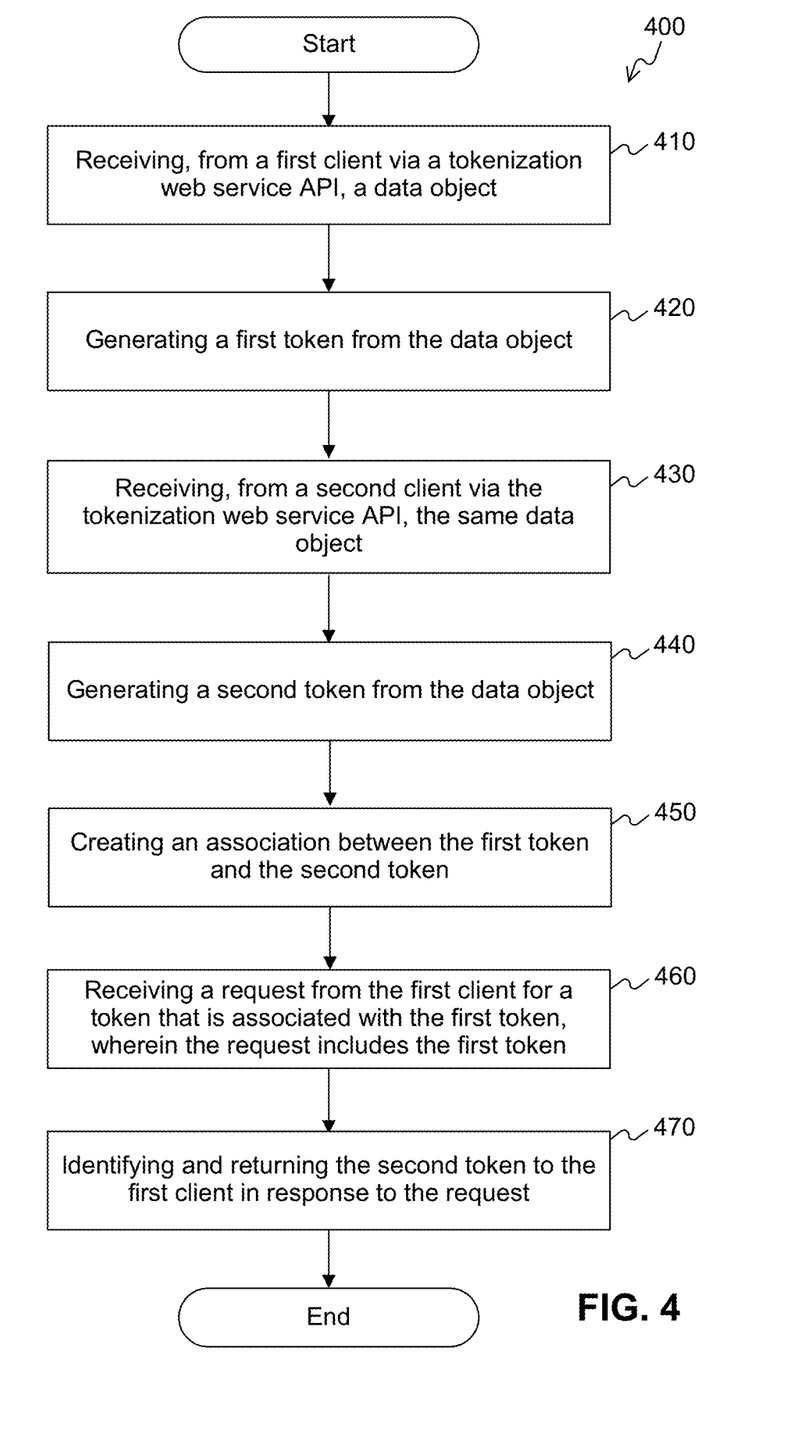
FIG. 4 is another example of a process for a tokenization web service, consistent with the principles of the disclosure.

FIG. 4 is another example of a process 400 for a tokenization web service, consistent with the principles of this disclosure. In some embodiments, process 400 may be implemented in software or firmware running on one or more servers, or other computing systems, that provides tokenization web services, such as a server that hosts the tokenization web service 130 of FIG. 1. As shown, process 400 begins with receiving a data object (e.g., a social security number) from a first client via a tokenization web service API. In some embodiments, the data object may be data that the first client does not wish to, or is not allowed to, reveal or disclose to other parties or transmit insecurely, such as a name, a social security number, a credit card number, or other personally identifiable information (PII). In various embodiments, stage 410 may be the result of an API call to generate a token for a data object, as described previously with respect to FIGS. 1 and 2 in connection with the request 141 for a token to be generated from specified source data.

At stage 420, process 400 generates a first token from the data object. Similar to stage 330 of process 300, in various embodiments, the token may be generated by a cryptographic hash function or the like, and in some embodiments, the format of the generated token may conform to criteria specified in the web service call. In various embodiments, stage 420 may be implemented as described previously with respect to the add function 224 of FIG. 2.

At stage 430, process 400 receives the same data object (e.g., the same social security number) from a second client via a tokenization web service API. Stage 420 performs the same process as stage 410, described above.

And like stage 420 above, stage 440 generates a second token from the data object. In various embodiments, the second token is different from the first token, although it is generated from the same data object, because the token-generation processing uses the identity of the requester (e.g., the API caller) as input to the token generator, in addition to using the data object itself. The different identities of each requester input into the token-generation processing, (which uses, e.g., a cryptographic hash algorithm) causes the generation of different tokens as output, even though the other data input into the processing (i.e., the data objects) are the same.

At stage 450, process 400 creates an association between the first token and the second token. In various embodiments, the association may be based on the origins of both the first token and the second token being from the same data object. In some embodiments, stage 450 may create an association between two different tokens by processing or storing them in a manner that conjoins, links, connects, or otherwise relates each token to the data object from which they were created, where that data object is the same for the two different tokens.

For example, referring for a moment to FIG. 2, the add function 224 of the tokenization subsystem 220 creates an association between "Token 123" 251 and "Token ABC" 252 by storing both "Token 123" 251 and "Token ABC" 252 in conjunction with the same encrypted representation of the same source data from which each was generated—namely "Encrypted Src Data X" 250, as shown in the first and last rows of the lookup table 255. In other words, by storing "Token 123" 251 in a manner such that it can be searched for, identified, or looked up using "Encrypted Src Data X" 250 as a search key, and by similarly storing "Token ABC" 252 in a manner such that it also can be searched for, identified, or looked up using "Encrypted Src Data X" 250 as a search key, the tokenization subsystem 220 has created an association between "Token 123" 251 and "Token ABC" 252, as represented by the arrows 260. Other embodiments may use the source data in its unencrypted form. Other ways of creating an association between two or more tokens based on their common source data are also within the scope of this disclosure.

Referring again to FIG. 4, process 400 continues at stage 460 by receiving a request from the first client for a token that is associated with the first token, wherein the request includes the first token. In various embodiments, the request from the first client for a token that is associated with the first token may be processed as described previously with respect to FIGS. 1 and 2 in connection with the request 171 for an associated token corresponding to a given input token, and more particularly, as described with respect to the find associate function 222 of FIG. 2.

At stage 470, process 400 identifies and returns the second token to the first client in response to the request for an associated token from stage 460. Again, as described previously with respect to FIGS. 1 and 2 with regard to the request 171 for an associated token corresponding to a given input token, and more particularly, as described with respect to the find associate function 222 of FIG. 2, various embodiments may detect, identify, match, or otherwise determine that two (or more) different tokens are associated with each other based on the fact that each of the two (or more) different tokens were generated from the same data object and because each of the two (or more) different tokens were stored or otherwise processed in a manner that indicates that they were generated from the same data object (e.g., as shown in table 255 of FIG. 2, first row and last row).

One of ordinary skill will recognize that process 400 is presented for conciseness and clarity of explanation, and that stages may be added to, deleted from, reordered, or modified within process 400 without departing from the principles of this disclosure.

Figure 5:
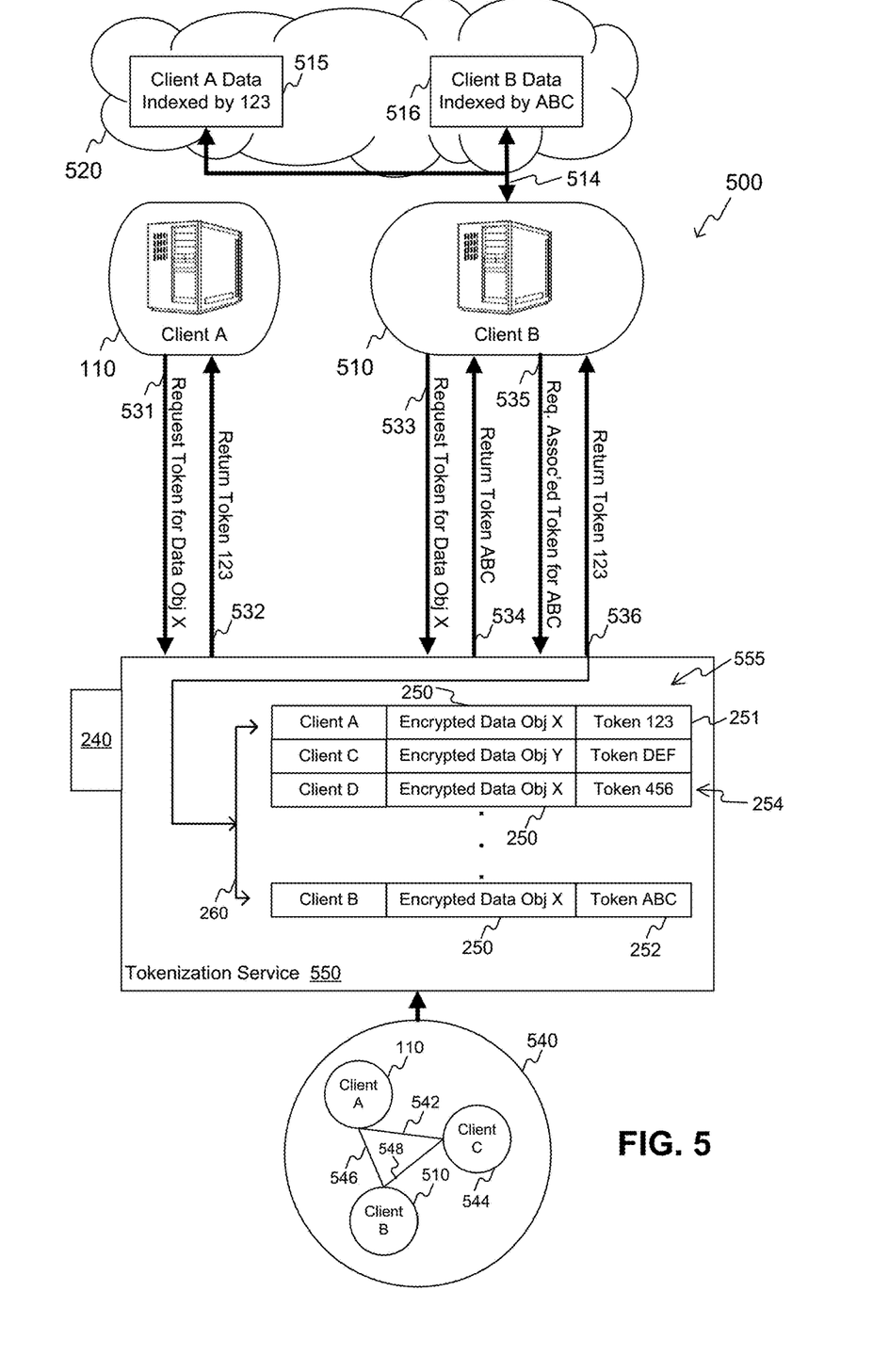
FIG. 5 illustrates an example of a system for a tokenization web service, consistent with the principles of the disclosure.

FIG. 5 illustrates an example of a system 500 for a tokenization service, consistent with the principles of this disclosure. In the example shown, client A 110 and client B 510 interact with a tokenization service 550 in a manner similar to that explained with respect to FIG. 4. In brief, client A 110 submits, for example via a call to the API (not shown) of the tokenization service 550, a request 531 to generate a token for data object X. In various embodiments, the tokenization service 550 may process the request 531 and return 532 the token "Token 123" to represent data object X, as explained above with respect to FIG. 4, stages 410-420. In the example of FIG. 5, as a result of this interaction, the tokenization service 550 may store an encrypted copy of data object X 250 in conjunction with the token "Token 123" 251, as shown in the first row of data structure 555. In this embodiment, the tokenization service 550 may also store the identity of the requestor, "Client A," in conjunction with the encrypted copy of data object X 250 and the token, as shown in the first column of the first row of data structure 555.

Similarly, client B 510 submits, for example via a call to the API (not shown) of the tokenization service 550, a request 533 to generate a token for the same data object X. Again, the tokenization service 550 may process the request 533 and return 534 the token "Token ABC" to represent data object X for client B 510, as explained above with respect to FIG. 4, stages 430-440. As shown in FIG. 5, as a result of this interaction with client B 510, the tokenization service 550 may store an encrypted copy of data object X 250 in conjunction with the token "Token ABC" 252 and in conjunction with the identity of the requestor "Client B," as shown in the last row of the data structure 555.

Next, client B 510 submits a request 535 for a token associated with "Token ABC." The tokenization service 550 may process the request 535 as explained above with respect to FIG. 4, stage 460.

In various embodiments, the tokenization service 550 may or may not return 536 the associated token "Token 123," depending on conditions specified by client A 110 and/or client B 510. In some embodiments, a condition for supplying an associated token to a requestor may be that the requestor and the client that generated the associated token be related, for example, as members of the same defined network or social graph 540. In such embodiments, only if client B 510 has established a relationship to client A 110 that is recognized by the tokenization service 550 will the tokenization service 550 return 536 client A's associated "Token 123" 251 to client B 510. Otherwise, the tokenization service 550 in this example will return to client B 510 an indication (not shown) that no associated tokens were found.

In the example shown in FIG. 5, the social graph 540 shows that client A 110 and client B 510 have defined a relationship 546 between them. Similarly, client A 110 and client C 544 have defined a relationship 542, and client B 510 and client C 544 have defined a relationship 548. In various embodiments, the tokenization service 550 may consult the social graph 540 to determine which clients are permitted to see each other's associated tokens. In various embodiments, the social graph 540 may be represented by a data structure internal to the tokenization service 550.

As noted above, the embodiment of FIG. 5 includes a lookup table 555 that contains a column (the first column in this example) indicating or identifying the client that generated the token in each row. Thus column 1, row 1 indicates that client A 110 generated "Token 123" 251, which represents Data Object X; column 1, row 2 indicates that client C generated "Token DEF," which represents Data Object Y; column 1, third row (reference number 254) indicates client D (not shown) generated "Token 456" which represents Data Object X; and column 1, last row indicates client B 510 generated "Token ABC," which represents Data Object X.

Thus, continuing the API call example above, after client B 510 submits a request 535 for a token associated with "Token ABC," the tokenization service 550 may search the lookup table 555 for rows that both 1) have tokens generated from "Data Object X" (as indicated by rows containing "Encrypted Data Obj X" in the second column of table 555); and 2) were created by a client (each creating client is indicated in column 1 of table 555) that has an established relationship to client B 510 as indicated by the social graph 540 for this embodiment. As shown, the first row of lookup table 555, meets both of these criteria because client A (row 1, column 1) has a relationship 546 with the requestor client B 510 (as shown in the social graph 540) and has the same "Encrypted Data Object X" (row 1, column 2, and last row, column 2) as does "Token ABC" 252. The second row of lookup table 555 does not meet both of these criteria because although client C (row 2, column 1) has a relationship 548 with client B 510, the "Encrypted Data Object Y" in row 2, column 2 is not the same as the "Encrypted Data Object X" in the last row, column 2. The third row 254 of lookup table 555 does not meet both of these criteria because although the "Encrypted Data Object X" in the third row (labeled 254), column 2 is the same as the "Encrypted Data Object X" in the last row, column 2, client D (row 254, column 1) does not have a relationship with client B according to the social graph 540.

Accordingly, in this example, the tokenization web service considers only the first row and the last row of table 555 to contain associated tokens, as represented by arrows 260, and will return 536 only "Token 123" to client B 510 in response to request 535.

Using its own "Token ABC" 252, client B 510 can access its own data 516 that is indexed by, or otherwise accessible using "Token ABC" 252. In addition, by using the associated "Token 123" 251 created by client A 110 and obtained using the association function of tokenization service 550, client B 510 can also access client A's data 515 that is indexed by, or otherwise accessible using "Token 123" 251. Thus, this embodiment enables users (e.g., clients) to collaborate and share data by creating associations between tokens and relationships between customers that allow the sharing of tokens.

One of ordinary skill will recognize that the components and implementation details of system 500 are simplified examples presented for conciseness and clarity of explanation. Other components, implementation details, and variations may be used.

Figure 6:
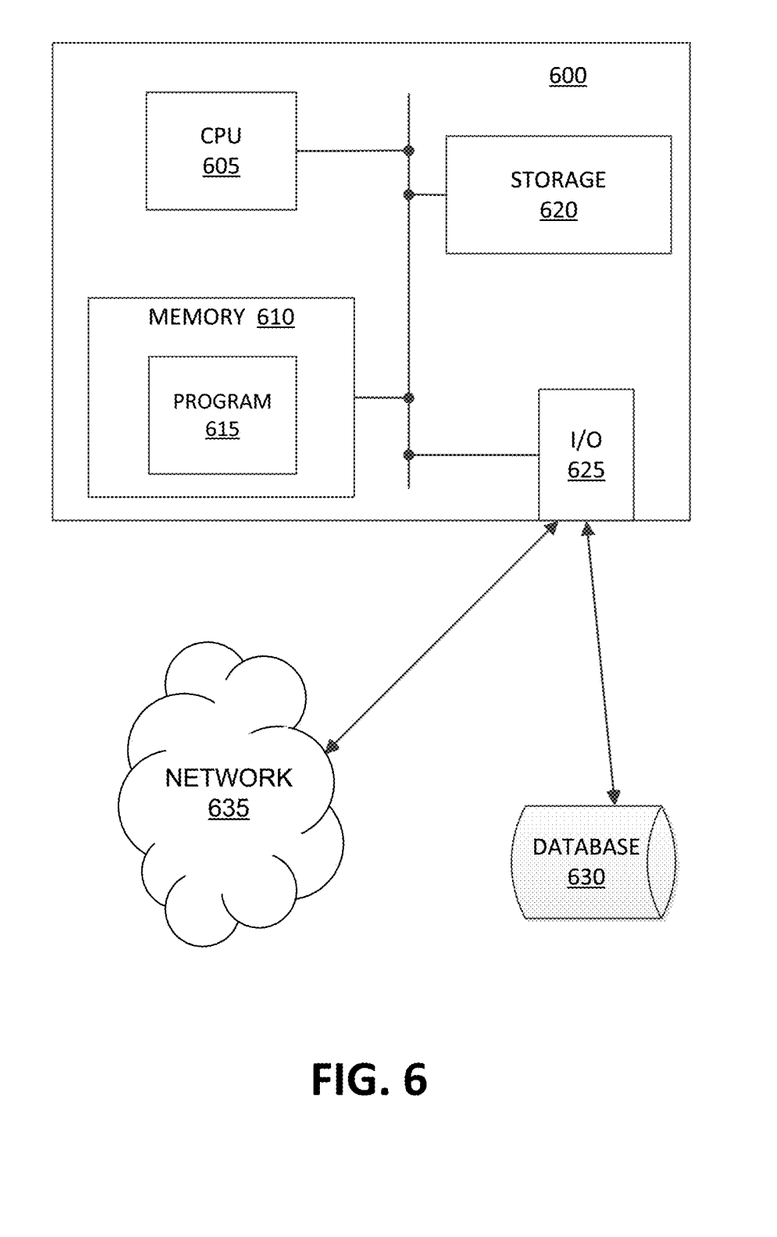
FIG. 6 is a block diagram of an example of a computing system useful for implementing systems and methods consistent with the principles of the disclosure.

FIG. 6 is a block diagram of an example of a computing system or data processing system 600 that may be used to implement embodiments consistent with this disclosure. Other components and/or arrangements may also be used. In some embodiments, computing system 600 may be used to implement, either partially or fully, various components of FIGS. 1, 2, and 5, such as the tokenization web service 130 and the tokenization service system 200. In some embodiments, computing system 600 may be used to implement, either partially or fully, process 300 of FIG. 3 and process 400 of FIG. 4, among other things.

Computing system 600 includes a number of components, such as a central processing unit (CPU) 605, a memory 610, an input/output (I/O) device(s) 625, and a nonvolatile storage device 620. System 600 can be implemented in various ways. For example, an implementation as an integrated platform (such as a server, workstation, personal computer, laptop, smart phone, etc.) may comprise CPU 605, memory 610, nonvolatile storage 620, and I/O devices 625. In such a configuration, components 605, 610, 620, and 625 may connect and communicate through a local data bus and may access a database 630 (implemented, for example, as a separate database system) via an external I/O connection. I/O component(s) 625 may connect to external devices through a direct communication link (e.g., a hardwired or local wifi connection), through a network, such as a local area network (LAN) or a wide area network (WAN), and/or through other suitable connections. System 600 may be standalone or it may be a subsystem of a larger system.

CPU 605 may be one or more known processors or processing devices, such as a microprocessor from the Core™ i7 family manufactured by the Intel™ Corporation of Santa Clara, Calif. or a microprocessor from the FX™ family manufactured by the AMD™ Corporation of Sunnyvale, Calif. Memory 610 may be one or more fast storage devices configured to store instructions and information used by CPU 605 to perform certain operations, functions, methods, and processes related to embodiments of the present disclosure. Storage 620 may be a volatile or non-volatile, magnetic, semiconductor, tape, optical, or other type of storage device or computer-readable medium, including devices such as CDs and DVDs, meant for long-term storage.

In the illustrated embodiment, memory 610 contains one or more programs or subprograms 615 loaded from storage 620 or from a remote system (not shown) that, when executed by CPU 605, perform various operations, procedures, processes, or methods consistent with the present disclosure. Alternatively, CPU 605 may execute one or more programs located remotely from system 600. For example, system 600 may access one or more remote programs via network 635 that, when executed, perform functions and processes related to embodiments of the present disclosure.

In one embodiment, memory 610 may include a program(s) 615 for a tokenization service. In another embodiment, memory 610 may include a program 615 that implements at least a portion of process 300 of FIG. 3, and or at least a portion of process 400 of FIG. 4. In yet another embodiment, memory 610 may include a program 615 that implements at least a portion of the functionality of the tokenization web service 130 as described with respect to FIG. 2. In some embodiments, memory 610 may also include other programs, applications, or data that implement other methods and processes that provide ancillary functionality. For example, memory 610 may include programs or data used to access, receive, transmit, gather, organize, store, and/or generate related data, such as requestor ID data, encryption key data, social graph data, etc.

Memory 610 may be also be configured with other programs (not shown) unrelated to this disclosure and/or an operating system (not shown) that performs several functions well known in the art when executed by CPU 605. By way of example, the operating system may be Microsoft Windows™, Unix™, Linux™, an Apple Computers™ operating system, Personal Digital Assistant operating system such as Microsoft CE™, or other operating system. The choice of operating system, and even to the use of an operating system, is not critical to this disclosure.

I/O device(s) 625 may comprise one or more input/output devices that allow data to be received and/or transmitted by system 600. For example, I/O device 625 may include one or more input devices, such as a keyboard, touch screen, mouse, and the like, that enable data to be input from a user. Further, I/O device 525 may include one or more output devices, such as a display screen, CRT monitor, LCD monitor, plasma display, printer, speaker devices, and the like, that enable data to be output or presented to a user. I/O device 625 may also include one or more digital and/or analog communication input/output devices that allow computing system 600 to communicate, for example, digitally, with other machines and devices. Other configurations and/or numbers of input and/or output devices may be incorporated in I/O device 625.

In the embodiment shown, system 600 is connected to a network 635 (such as the Internet, a private network, a virtual private network, or other network), which may in turn be connected to various systems and computing machines (not shown), such as servers, personal computers, laptop computers, client devices (e.g., client A 120 or client B 510), etc. In general, system 600 may input data from external machines and devices and output data to external machines and devices via network 635.

In the example of an embodiment shown in FIG. 6, database 630 is a standalone database external to system 600. In other embodiments, database 630 may be hosted by system 600. In various embodiments, database 630 may manage and store data used to implement systems and methods consistent with this disclosure. For example, database 630 may manage and store data structures that implement the token storage subsystem 230 and/or lookup table 255.

Database 630 may comprise one or more databases that store information and are accessed and/or managed through system 600. By way of example, database 630 may be a noSQL database, an Oracle™ database, a Sybase™ database, or some other database. Systems and methods consistent with this disclosure, however, are not limited to separate data structures or databases, or even to the use of a formal database or data structure.

One of ordinary skill will recognize that the components and implementation details of the system in FIG. 6 are examples presented for conciseness and clarity of explanation. Other components and implementation details may be used.

Other embodiments of this disclosure will be apparent to those skilled in the art from consideration of the specification and practice of the embodiments disclosed herein. It is intended that the specification and examples be considered as possibilities only, with a true scope and spirit being indicated by the following claims.

What is claimed is:

1. A non-transitory computer-readable medium containing instructions that, when executed by a processor, implement a tokenization service configured to perform operations comprising:
  receiving, from a first client via a tokenization service application programming interface ("API"), a first request to create a first token for a data object specifying one or more token-formatting instructions;
  executing an add function implemented by the tokenization service in response to the first request, including:
    generating the first token from the data object, wherein the first token is generated in a first format according to the one or more token-formatting instructions;
    returning the first token to the first client, wherein the first token is used by the first client to represent the data object in the first client's data records; and
    storing the first token in a database, wherein the first token is associated with the first client in the database;
  receiving, from a second client via the tokenization service API, a second request to create a second token for the data object;
  executing the add function in response to the second request, including:
    generating the second token from the data object, wherein the second token is generated in a second format different from the first format;
    returning the second token to the second client, wherein the second token is used by the second client to represent the data object in the second client's data records;
    storing the second token in the database, wherein the second token is associated with the second client in the database; and
    creating an association between the first token and the second token in the database;
  receiving, via the tokenization service API, a third request to authorize collaboration between the first client and the second client using the first and second tokens, the third request specifying the first token or the second token;
  executing an authorize function in response to the third request, wherein the authorize function defines a relationship between the first client and the second client in a stored graph of a plurality of clients of the tokenization service, and the defined relationship authorizes the first client to retrieve the second token that is associated with the first token;
  receiving a fourth request from the first client via the tokenization service API to retrieve a token stored in the database that is associated with the first token, wherein the fourth request includes the first token;
  executing a find associate function implemented by the tokenization service in response to the fourth request, including:
    performing one or more searches in the database to determine that the second token is associated with the first token;
    subsequent to the one or more searches, determining that the first client is authorized to retrieve the second token associated with the first token based at least in part on the defined relationship between the first and second clients in the stored graph; and
    returning the second token to the first client via the tokenization service API, wherein the second token is used by the first client to access the data object in the second client's data records.

2. The non-transitory computer-readable medium of claim 1, wherein to create the association, the instructions when executed by the processor cause the tokenization service to perform operations comprising:
  indicating that the first token and the second token were both created from the same data object.

3. The non-transitory computer-readable medium of claim 1, wherein to create the association, the instructions when executed by the processor cause the tokenization service to perform operations comprising:

storing the first token and the second token in a manner that shows both were created from the same data object.

4. The non-transitory computer-readable medium of claim 1,
wherein to store the first token in the database, the instructions when executed by the processor cause the tokenization service to perform operations comprising:
storing the first token in conjunction with the data object in a manner that allows the first token to be identified using the data object; and
wherein to store the second token in the database, the instructions when executed by the processor cause the tokenization service to perform operations comprising:
storing the second token in conjunction with the data object in a manner that allows the second token to be identified using the data object.

5. The non-transitory computer-readable medium of claim 1, wherein the instructions when executed by the processor cause the tokenization service to create the association based at least in part on a determination that the first client and the second client have established the defined relationship.

6. A method comprising performing, by a tokenization service implemented by one or more processors and associated memory:
receiving, from a first client via a tokenization service application programming interface ("API"), a first request to create a first token for a data object specifying one or more token-formatting instructions;
executing an add function implemented by the tokenization service in response to the first request, including:
generating the first token from the data object, wherein the first token is generated in a first format according to the one or more token-formatting instructions;
returning the first token to the first client, wherein the first token is used by the first client to represent the data object in the first client's data records; and
storing the first token in a database, wherein the first token is associated with the first client in the database;
receiving, from a second client via the tokenization service API, a second request to create a second token for the data object;
executing the add function in response to the second request, including:
generating the second token from the data object, wherein the second token is generated in a second format different from the first format;
returning the second token to the second client, wherein the second token is used by the second client to represent the data object in the second client's data records;
storing the second token in the database, wherein the second token is associated with the second client in the database;
creating an association between the first token and the second token in the database;
receiving, via the tokenization service API, a third request to authorize collaboration between the first client and the second client using the first and second tokens, the third request specifying the first token or the second token;
executing an authorize function in response to the third request, wherein the authorize function defines a relationship between the first client and the second client in a stored graph of a plurality of clients of the tokenization service, and the defined relationship authorizes the first client to retrieve the second token that is associated with the first token;
receiving a fourth request from the first client via the tokenization service API to retrieve a token stored in the database that is associated with the first token, wherein the fourth request includes the first token;
executing a find associate function implemented by the tokenization service in response to the fourth request, including:
performing one or more searches in the database to determine that the second token is associated with the first token;
subsequent to the one or more searches, determining that the first client is authorized to retrieve the second token associated with the first token based at least in part on the defined relationship between the first and second clients in the stored graph; and
returning the second token to the first client via the tokenization service API, wherein the second token is used by the first client to access the data object in the second client's data records.

7. The method of claim 6, wherein creating the association further comprises:
indicating that the first token and the second token were both created from the same data object.

8. The method of claim 6, wherein creating the association further comprises:
storing the first token and the second token in a manner that shows both were created from the same data object.

9. The method of claim 6,
wherein storing the first token in the database comprises:
storing the first token in conjunction with the data object in a manner that allows the first token to be identified using the data object; and
wherein storing the second token the database comprises:
storing the second token in conjunction with the data object in a manner that allows the second token to be identified using the data object.

10. The method of claim 6, wherein creating the association further comprises:
determining whether the first client and the second client have established the relationship; and
creating the association only if the first client and the second client have established the relationship.

11. The method of claim 6, wherein the one or more searches in the database are performed on a lookup table with a field for storing encrypted copies of data objects, and the one or more searches are performed based at least in part on an indexing of the field.

12. The method of claim 6, further comprising performing, by the tokenization service:
receiving, from the first client and via the tokenization service API, a fifth request that references the first token and indicates to retrieve the data object;
retrieving the data object based on the first token; and
returning the data object to the client.

13. The method of claim 6, further comprising performing, by the tokenization service:
receiving, from the first client and via the tokenization service API, a fifth request that references the first token and indicates a deletion operation;
deleting the data object based on the first token; and
deleting the first token.

14. The method of claim 6, wherein the tokenization service is implemented as a web service, and further comprising publishing, by the tokenization service, a Web Services Description Language (WSDL) interface description of the tokenization service.

15. The method of claim 6, wherein creating the association between the first token and the second token in the database comprises:
   storing the first token in the database in a manner that shows the first token and the second token were created from the same data object.

16. The method of claim 6, further comprising:
   encrypting the data object using an encryption key to obtain a first encrypted copy of the data object; and
   storing the first encrypted copy of the data object with the first token in the database.

17. A system, comprising:
   a memory containing instructions; and
   a processor, operably connected to the memory, that executes the instructions to implement a tokenization service operable to perform operations comprising:
      receiving, from a first client among a plurality of clients and via a tokenization service application programming interface ("API"), a first service call from among a plurality of service calls, wherein the first service call references a data object and specifies one or more token-formatting instructions;
      executing an add function implemented by the tokenization service in response to the first service call, including:
         generating a first token from the data object, wherein the first token is generated in a first format according to the one or more token-formatting instructions;
         returning the first token to the first client, wherein the first token is used by the first client to represent the data object in the first client's data records; and
         storing the first token in a database, wherein the first token is associated with the first client in the database;
      receiving, from a second client among the plurality of clients and via the tokenization service API, a second service call from among the plurality of service calls, wherein the second service call specifies to generate a second token for the data object;
      executing the add function in response to the second service call, including:
         generating the second token from the data object, wherein the second token is generated in a second format different from the first format;
         returning the second token to the second client, wherein the second token is used by the second client to represent the data object in the second client's data records;
         storing the second token in the database, wherein the second token is associated with the second client in the database;
         creating an association between the second token and the first token in the database;
      receiving, via the tokenization service API, a third service call from among the plurality of service calls, wherein the third service call specifies the first token or the second token and to authorize collaboration between the first client and the second client using the first and second tokens;
      executing an authorize function in response to the third service call, wherein the authorize function defines a relationship between the first client and the second client in a stored graph of a plurality of clients of the tokenization service, and the defined relationship authorizes the first client to retrieve the second token that is associated with the first token;
      receiving, from the first client and via the tokenization service API, a fourth service call from among the plurality of service calls, wherein the fourth service call references the first token and requests an associated token;
      executing a find associate function implemented by the tokenization service in response to the fourth service call, including:
         performing one or more searches in the database to retrieve the second token based at least in part on the association between the second token and the first token;
         subsequent to the one or more searches, determining that the first client is authorized to retrieve the second token associated with the first token based at least in part on the defined relationship between the first and second clients in the stored graph; and
         returning the second token to the first client, wherein the second token is used by the first client to access the data object in the second client's data records.

18. The system of claim 17, wherein the tokenization service is operable to perform operations comprising:
   receiving, from the first client and via the tokenization service API, a fifth service call from among the plurality of service calls, wherein the fifth service call references the first token;
   retrieving the data object based on the first token; and
   returning the data object to the first client.

19. The system of claim 17, wherein the tokenization service is operable to perform operations comprising:
   receiving, from the first client and via the tokenization service API, a fifth service call from among the plurality of service calls, wherein the fifth service call references the first token and indicates a deletion operation;
   deleting the data object based on the first token; and
   deleting the first token.

20. The system of claim 17, wherein the first token preserves a format of the data object and the second token does not preserve the format.

21. The system of claim 17, wherein the first token is generated based at least in part on a first requestor identifier associated with the first client, and the second token is generated base at least in part on a second requestor identifier associated with the second client.

22. The system of claim 17,
   wherein to store the first token in the database, the tokenization service operable to store the first token in conjunction with the data object in a manner that allows the first token to be identified using the data object; and
   wherein to store the second token in the database, the tokenization service operable to store the second token in conjunction with the data object in a manner that allows the second token to be identified using the data object.

* * * * *